(12) United States Patent
Park et al.

(10) Patent No.: US 8,297,982 B2
(45) Date of Patent: Oct. 30, 2012

(54) SIMULATED ABDOMINAL WALL

(75) Inventors: Adrian E. Park, Crownsville, MD (US);
F. Jacob Seagull, Baltimore, MD (US);
Ivan M. George, Columbia, MD (US)

(73) Assignee: University of Maryland, Baltimore,
Baltimore, MD (US)

( * ) Notice: Subject to any disclaimer, the term of this patent is extended or adjusted under 35 U.S.C. 154(b) by 334 days.

(21) Appl. No.: 12/706,022

(22) Filed: Feb. 16, 2010

(65) Prior Publication Data

US 2010/0209899 A1    Aug. 19, 2010

Related U.S. Application Data

(60) Provisional application No. 61/153,327, filed on Feb. 18, 2009.

(51) Int. Cl.
*G09B 23/28* (2006.01)
(52) U.S. Cl. .................................................. 434/262
(58) Field of Classification Search .......... 434/262–275;
623/23, 72, 7, 8, 11.11, 15.12; 424/486;
401/192, 195; 514/283, 449, 453; 436/8;
73/12.01, 432.1, 866.4, 866.5; 602/44–46
See application file for complete search history.

(56) References Cited

U.S. PATENT DOCUMENTS

| 4,481,001 | A | 11/1984 | Graham et al. |
| 5,290,217 | A | 3/1994 | Campos |
| 5,775,916 | A | 7/1998 | Cooper et al. |
| 5,908,302 | A | 6/1999 | Goldfarb |
| 6,336,812 | B1 | 1/2002 | Cooper et al. |
| 7,850,454 | B2 * | 12/2010 | Toly .............................. 434/267 |
| 2005/0026125 | A1 | 2/2005 | Toly |

* cited by examiner

*Primary Examiner* — Timothy A Musselman
(74) *Attorney, Agent, or Firm* — Whiteford, Taylor & Preston LLP

(57) ABSTRACT

A physical model representing an anatomic model of the abdominal wall that provides for the option of: tactile feedback, the option for photo realism, the inclusion of various pathologies (including, but not limited to, abdominal wall defects such as hernia), and the customizability to mount the model to various training boxes or frames. This medical/anatomic simulation model is composed of various material layers including, but not limited to, non-elastomeric and elastomeric materials such as papers, fabrics, metallic sheets, metallic meshes, rubber-like foams, and other materials. This is a physical/mechanical model that simulates skin, tissue, and organs associated with abdominal wall morphology and pathology.

18 Claims, 2 Drawing Sheets

SIMULATED ABDOMINAL WALL

CROSS REFERENCE TO RELATED APPLICATION

This application is based upon and claims benefit of co-owned U.S. Provisional Patent Application Ser. No. 61/153,327 entitled "Simulated Abdominal Wall", filed with the U.S. Patent and Trademark Office on Feb. 18, 2009 by the inventors herein, the specification of which is incorporated herein by reference.

BACKGROUND OF THE INVENTION

1. Field of the Invention

The present invention relates generally to anatomical teaching models, and more particularly to an anatomical teaching model that illustrates a simulated abdominal wall.

2. Background

A hernia is an abnormal protrusion of an organ, tissue, or any anatomical structure through a forced opening in some part of the surrounding muscle wall. A hernia is formed by a weakening of the musculofascial tissues defining the structural wall of a body cavity such as the abdomen, resulting in a gap through which tissues can protrude. Typically, a sac is formed confining the tissues at the musculofascial defect, which sac protrudes from the plane of the tissue wall.

A weakening or separation of the musculofascial tissues due to any cause can develop into a hernia. For example scarring from a previous incision or other trauma of the abdominal wall can develop into a hernia, or a hernia can form at the site of a passage through the musculofascial tissue, the passage becoming enlarged, for example, due to pressure of the viscera during muscular exertion. There are various forms of hernias, the inguinal hernia being a common example wherein the abdominal viscera and peritoneal sac protrude through the floor of the inguinal cavity at the point where the musculofascial tissue is relatively weakened due to the passage of the spermatic duct (in males) or the femoral blood vessels and the round ligament (in females). Another common site of a hernia is the passage of the umbilical cord. Hernias can also develop in the diaphragm, and elsewhere. In general, similar problems occur wherever visceral tissues are abutted against a confining wall of tissue that, when weakened for whatever reason, permits the tissues to protrude through the confining wall. For example, if a part of the intestine were to protrude through the surrounding abdominal wall, it would create a hernia—an abdominal hernia.

Hernias occur in both males and females in the groin area, also called the inguinal region. In both sexes, the abdominal wall may be weak on both right and left sides a little above the crease in the groin. If a part of the intestines or other tissue within the abdominal cavity pushes through one of the weak spots, it forms a hernia—an inguinal hernia.

Before the piece of intestine or other abdominal cavity tissue, called the hernial mass, makes its way through the weak spot in the muscle, it must first push its way through the peritoneum, the membrane that lines the abdomen.

Inguinal hernias can be indirect space inguinal hernias or direct space inguinal hernias. An indirect space inguinal hernia occurs in the following manner. The lower part of the abdominal wall where such hernias occur, the inguinal region, is comprised of two layers, an inner layer, and an outer layer. Each layer has a weak spot in it but the weak spots are not directly aligned with each other. The weak spots in each layer are positioned slightly apart from each other.

In the medical field, it is necessary for students, doctors, and surgeons to be able to practice surgical and clinical techniques. More particularly, there is the need to practice the making of incisions, the removal or repair of various kinds of complaint (such as cysts and hernias, for example), access to structures below the epidermis and the insertion of sutures. As an alternative to providing an actual body or part of an actual body for practicing such techniques, there is a need for artificial means whereby they can be practiced.

Prospective surgical patients must be provided with adequate, easily understandable information regarding any surgical procedure, prior to the surgery, in order to grant their "informed consent" to the procedure. Patients must be apprised of traditional anterior abdominal surgical approaches, as well as, laparoscopic methods. In addition, the inclusion of prosthetic meshes, and the like, as a part of the surgical repair must be accurately and effectively described to the patient. Physicians have had few options to turn to for support in their efforts to provide a patient with easily understood explanations of these complex (at least to the patient) surgical procedures.

A variety of teaching methods are used in the biological and medical arts studies. One method of teaching the subject matter has been the development of three-dimensional models that allow students to better visualize the interrelationship between organs and tissues in a patient's body, as well as components of individual organs or structural components. Typically, these models are used to describe major organs, or organ systems. In particular, models have been developed to illustrate major systems such as the gastrointestinal tract. They typically provide a three-dimensional model that students can use to better understand the digestive system.

Known structures providing simulations of body tissue suffer from the disadvantage that they are not sufficiently analogous, either visually or physically, to actual body tissue.

One such simulated structure is described in U.S. Pat. No. 4,481,001 to Graham et al. discloses a human skin model for training/demonstration purposes. The model is a composite of several layers to simulate subcutaneous tissue and a dermis-simulating layer that has a slightly greater hardness than the subcutaneous tissue-simulating layer. An epidermis-simulating layer is made of a high tear strength, high tensile strength elastomer. One or more of the layers may be contoured so that the surface of the model is shaped to simulate contour defects in natural skin.

Another example of a training model of the prior art is described in U.S. Pat. No. 6,336,812 to Cooper et al., which discloses a training apparatus providing a simulation of at least part of a body and simulations of internal body structures for a particular part of the anatomy and being of increasing anatomical complexity and/or presenting increasing clinical or surgical difficulty.

U.S. Pat. No. 5,908,302 to Goldfarb describes a model for simulating inguinal hernias including a frame and a plurality of sheets supported by the frame in overlapping relation to one another to create an anatomically accurate simulation of a portion of a patient's abdomen. Each of the sheets includes predefined openings. One or more balloons are used to simulate a hernial sac. Anatomically correct overlays may be placed in overlapping relation to the front and back of the frame to show a patient the relative placement of other anatomical structures relative to the position of the hernia.

It would be desirable to provide a physical/mechanical model that simulates skin, tissue, and organs associated with abdominal wall morphology and pathology.

SUMMARY OF THE INVENTION

No simulator currently in production can provide the specific capabilities of providing variable multiple tissue layer simulation, a two sided photo realistic abdominal wall, tissue deformability, and procedure specific components that function with actual operative/clinical instrumentation or with other simulated skills Furthermore, there are few if any virtual or augmented reality simulators that simulate ventral hernia repair. Currently, virtual reality simulators have other limitations that make them inferior to physical models in many cases. The model of the present invention lends itself to use in augmented reality systems that can provide videoscopic scene analysis for the evaluation of performance metrics. In general, the model of the present invention is designed to manage a number of abdominal wall conditions.

Accordingly, it is an object of the present invention to provide an abdominal wall simulator device that avoids the disadvantages of the prior art.

It is further an object of the present invention to provide a simulated abdominal wall to simulate ventral hernia repair and that can be used to simulate other abdominal wall procedures.

It also is an object of the present invention to provide a simulated abdominal wall that presents a trainee with a view of the abdominal wall, a hernia defect, and abdominal "adhesions" to remove or manipulate. A further related object is to provide a simulated abdominal wall that enables a trainee to perform various procedures, including a laparoscopic or open incisional herniorrhaphy procedure.

It is another object of the present invention to provide a simulated abdominal wall that can simulate bleeding and/or non-bleeding anatomic structures.

It is another object of the present invention to provide a simulated abdominal wall model that can be used for surgical practice, technique refinement, development of new techniques, or assisting clinical technologies.

These and other objects of the present invention are accomplished by providing a physical model representing an anatomic model of the abdominal wall that provides for the option of: tactile feedback, the option for photo realism, the inclusion of various pathologies (including, but not limited to, abdominal wall defects such as hernia), and the customizability to mount the model to various training boxes or frames. Utilizing various materials including, but not limited to, fabric, foam, hard, soft, and polymers of varying compliance, an abdominal wall is fashioned with the use of these materials as well as photo realistic layers and approximated/moulaged pathologies as intended.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF EXEMPLARY EMBODIMENTS

Figure 1:
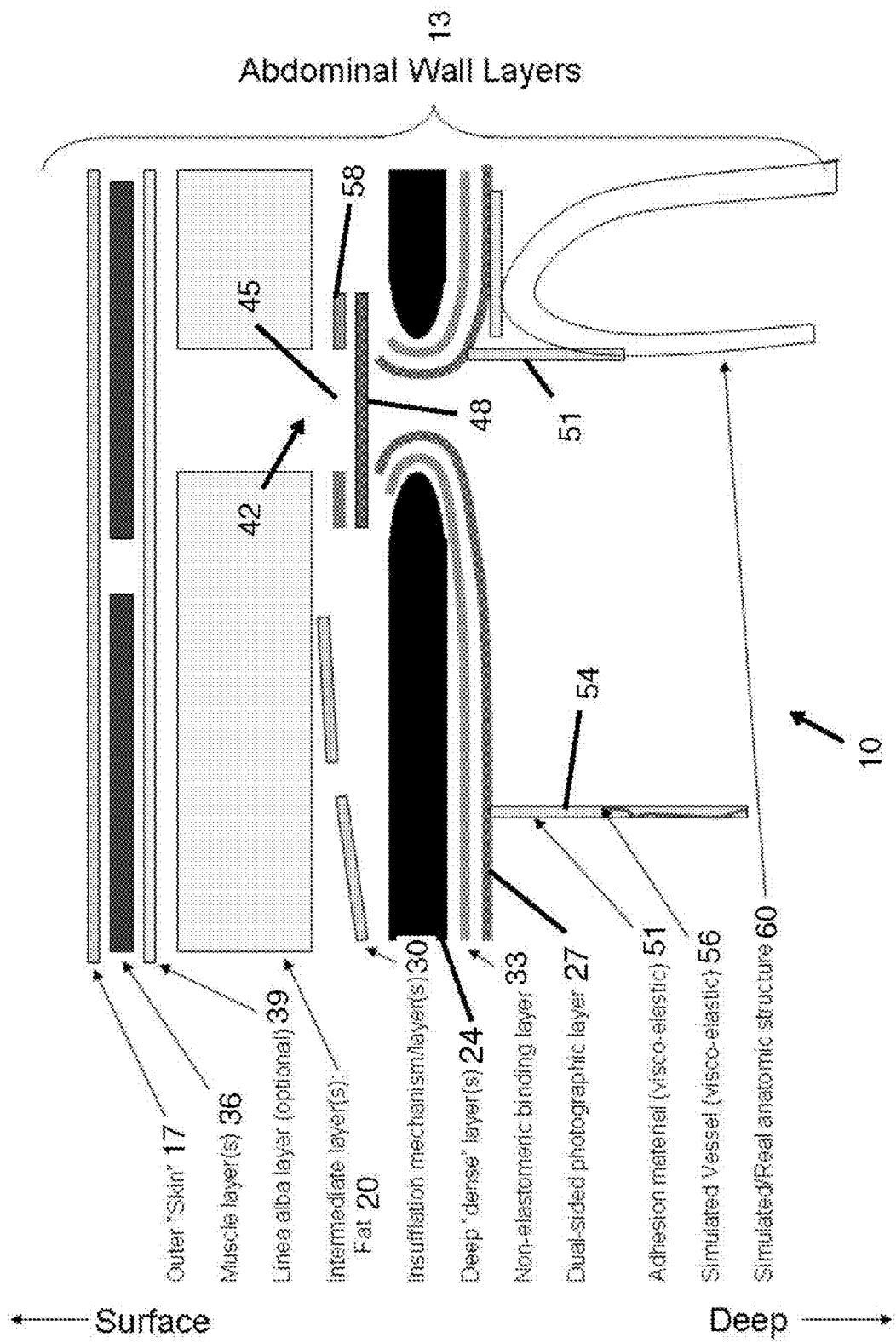
FIG. 1 is a side view of simulated abdominal wall layers according to a first embodiment of the present invention.

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Referring to the drawings, a medical/anatomic simulation model according to the present invention is composed of various material layers including, but not limited to, non-elastomeric and elastomeric materials such as papers, fabrics, metallic sheets, metallic meshes, rubber-like foams, and other materials. This is a physical/mechanical model that simulates skin, tissue, and organs associated with abdominal wall morphology and pathology.

As disclosed in the present invention, the model can incorporate:

1 An incisional/ventral hernia. The model can present a trainee with a view of the abdominal wall, a hernia defect, and/or abdominal "adhesions" to repair or manipulate. A trainee can then perform various procedures including a laparoscopic or open incisional herniorrhaphy procedure. This model can also include simulated bleeding and non-bleeding anatomic structures.

2 An abdominal domain presenting with adhesions (requiring lysis of adhesions: a procedure to remove the adhesions from the abdominal wall). This model can also include simulated bleeding and non-bleeding anatomic structures.

3 An open procedure model where one can perform an open ventral/incisional herniorrhaphy (from the "outside/skin" towards in the interior of the simulated abdomen).

4 An abdominal wall opening through which one can practice multiport, single port, and hand port procedures or skills FIG. 1 shows a model 10 according to the present invention. The model 10 incorporates several layers that may be included in a simulated abdominal wall 13. Variable and various layers of foam and fabric, which each have various physical properties, including variable elasticity and hardness, thereby allowing for the recreation of abdominal wall feel, thickness, pathology, and variability. The "wall" 13 is stretched and affixed to and/or over any type of trainer box, frame or skeleton, such as shown generally as 14 in FIG. 2, that is adapted to allow an interface The outer "skin" 17 has components incorporated into it that affix it to a frame 14. Additionally, the skin 17 can be used to encase much of the remaining layers. Preferably, each layer has components incorporated into it to affix the layer to frame 14. In some embodiments, the outer skin 17 may consist of a synthetic felt material with one side bearing a covering of thin plastic. While such material is commercially available, it is not traditionally used to simulate skin. Additionally, in some embodiments, an intermediate layer may consist of low-density visco-elastic "memory" foam to simulate the fatty tissue 20 between the epidermis and the underlying abdominal muscle wall. A layer two to three inches thick can be used to simulate a bariatric patient. For further, deep layers 24, a neoprene material may be used. The Neoprene may be substituted with Styrene Butadiene Rubber, Nitrile rubbers, or a blend of Neoprene and these materials. This layer simulates the muscle layer of the abdominal wall.

Figure 2:
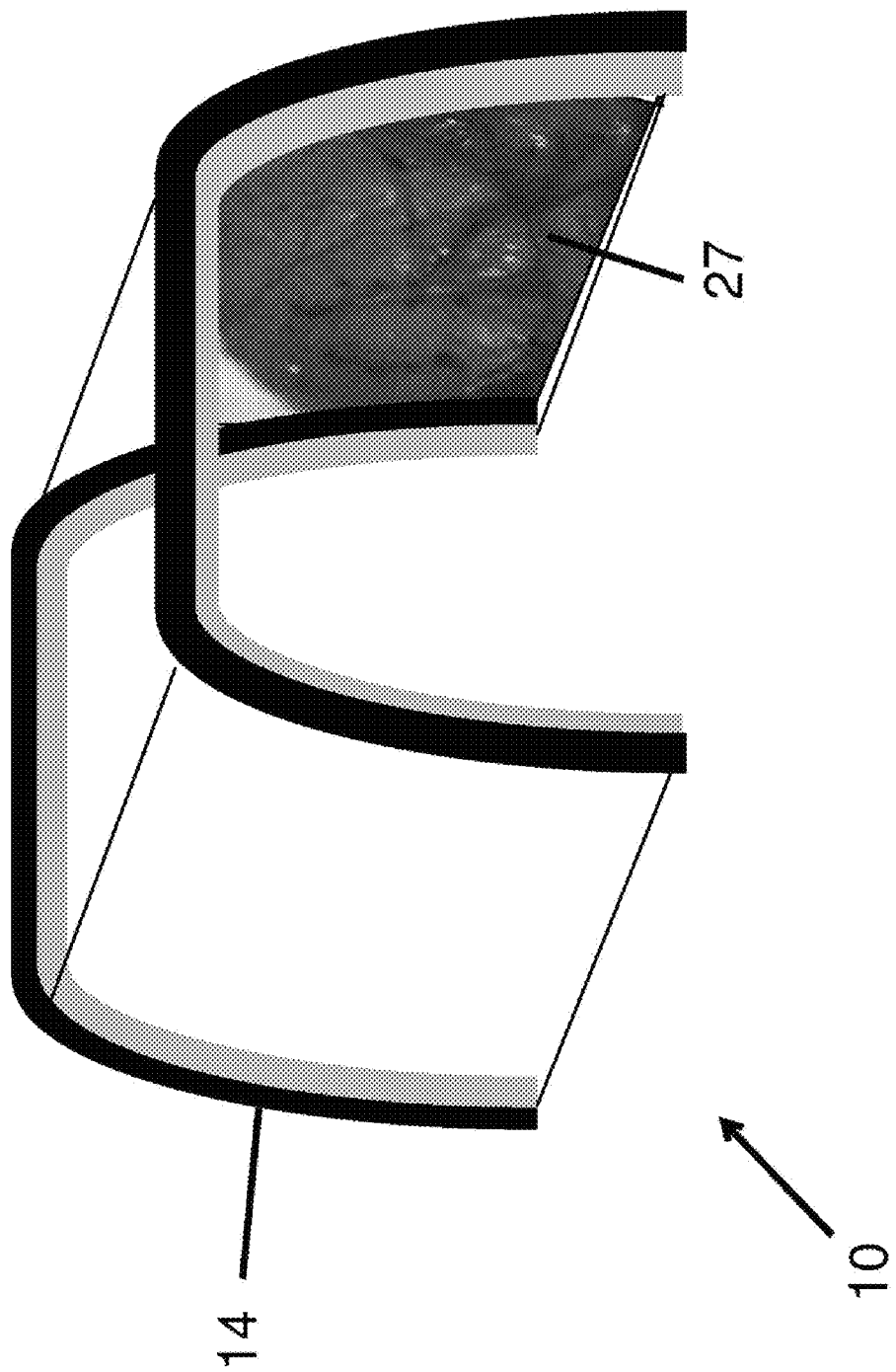
FIG. 2 is a view of frame for a simulated abdominal wall including a variable photo realistic image of abdominal wall according to a first embodiment of the present invention.

The innermost layer 27 can be simulated using either cotton or silk thin cloth. Any thin, fine material that accepts printing can be used. This layer is printed with images of abdominal wall anatomy (non-specific), showing fibers, blood vessels, and other representative images and colors. In a preferred embodiment, the image is taken from a digital photograph of the relevant anatomy, as shown in FIG. 2. In the Ventral Hernia model, the image may include an anatomical defect. The material may be affixed to the third layer with adhesives.

In some embodiments, a mechanism for insufflation 30 may be included between or within the intermediate layers in the wall 13. The insufflation mechanism 30 may include flexible tubes or other devices to simulate blood vessels and may provide simulated blood fluid to the model.

The model is designed to:

Be placed over a structural frame to represent skeletal structure to hold the model skin/tissue in place, creating an abdominal cavity. Various frames are either commercially available or can be built. Such frames are typically used as training boxes for endoscopic procedures.

Include multi-layer skin/muscle simulation, with layers representing various anatomical structures (e.g. epidermis, muscle wall, fatty tissue).

Provide a one or two sided photorealistic inner abdominal wall image that can be viewed via direct visualization, or by a surgical cut down, allowing for the skin-side of the layer to be viewed from a surgical incision made from the outside of the model. The photorealistic layer, when used, can be connected to the subsequent layers via a non-elastomeric component/layer.

Have the capacity to either be insufflated or provide for a simulated insufflated physical shape.

In general, the model 10 is designed to mimic the tissue-tool interface as closely as possible by the inclusion or exclusion of "layers" of material that approximate what interactions typically occur in real-world procedures. Based on the abdominal wall defect being modeled, layers can be added or inserted as required to increase or decrease the degree of realism required. The model 10 can be used to simulate surgical procedures on the abdominal wall 13 for surgical practice, technique refinement, development of new techniques, or assisting clinical technologies.

Typically, the model 10 has a "skin" 17 made of a fabric, one or more muscle layers 36, optional layers such as the linea alba layer 39, one or more fat layers 20, one or more layers of dense material 24 that simulates the durometry of the interior abdominal wall 13, a non-elastomeric binding layer 33 to which a dual sided photographic layer 27 is affixed.

In instances where a hernia defect 42 is simulated, the hernia defect 42 consists of an opening 45 in various layers of the model 10. The outer skin 17 is typically kept intact, and the innermost layer 27 is altered at the point of the defect, so that that it follows the contour of the defect into the more superficial layers. At the point of the defect 42, a hole 45 can be placed in the appropriate layer, and a piece of inner-layer material 48 (larger than the hole 45) can be placed between the intermediate layers 20, 24.

To simulate adhesions 51 to the abdominal wall 13, or those associated with other pathologies like a ventral hernia, the model 10 uses pliable rubber-like, tissue like material 54 in the shape, color, and texture typical of actual adhesions. In some embodiments, a plastisol material can be used to create simulated adhesions and other anatomic structures that affix to or are deep to the abdominal wall 13. The material can be colored and formed through a hot molding process into the shape of adhesions 51, which are then fastened within and around the simulated defect 42 with mechanical fasteners and/or with adhesives. Blood vessels can be simulated with appropriate colored tubing 56 or similar material. Other materials, such as a hydrogel or silicone rubber 58 can also be used to simulate tissue. In some embodiments, the model may include real or simulated anatomic structure 60.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A model for simulating a herniated abdominal wall suitable for medical training comprising:

a frame;

a plurality of layers supported by said frame in overlapping relation to one another so as to create an anatomically accurate simulation of a portion of a patient's abdominal wall, wherein said layers comprise one outer layer, one innermost layer, and at least one interior superficial layer;

a simulated hernia in the abdominal wall, wherein a hole extends through the innermost layer and at least one interior superficial layer, and the hole in the innermost layer follows the contour of the hernia into the one or more interior superficial layers, a separate piece of material located between the inner most layer and an interior superficial layer that covers said hole; and an intact outer layer, wherein material for each layer is selected for its ability to provide visual and/or tactile feedback simulating anatomical structures; and at least one layer comprises a two-sided photo realistic image of anatomical features within the abdominal wall.

2. The model according to claim 1 wherein said two sided realistic image can be viewed by direct visualization.

3. The model according to claim 1 wherein said two sided realistic image can be viewed by surgical cut down.

4. The model according to claim 1 wherein said two sided realistic image is connected to another layer in the model.

5. The model according to claim 1 wherein each of said layers is formed from a material that is adapted to simulate living tissue.

6. The model according to claim 5 wherein a first layer is fabricated so as to resemble the look and feel of the epidermis of a surgical patient.

7. The model according to claim 6 wherein said first layer comprises a synthetic felt material having a covering of plastic on one side.

8. The model according to claim 5 wherein at least one layer is fabricated so as to resemble the look and feel of fatty tissue.

9. The model according to claim 8 wherein said at least one layer resembling fatty tissue comprises a low-density viscoelastic foam.

10. The model according to claim 5 wherein at least one layer is fabricated so as to resemble the look and feel of muscle tissue.

11. The model according to claim 10 wherein said at least one layer resembling muscle tissue comprises material selected from the group consisting of:
   neoprene;
   styrene butadiene rubber;
   nitrile rubber; and
   combinations of the above.

12. The model according to claim 1 further comprising at least one insufflations layer.

13. The model according to claim 12 wherein said insufflations layer comprises means for releasing a fluid.

14. The model according to claim 13 wherein said fluid is under pressure.

15. The model according to claim 13 wherein said fluid comprises simulated blood.

16. The model according to claim 1 further comprising at least one simulation of an adhesion.

17. The model according to claim 16 wherein said adhesion simulation comprises a plastisol material.

18. The model according to claim 1 further comprising hydrogel or silicone rubber to simulate tissue.

* * * * *